(12) United States Patent
Nakahata et al.

(10) Patent No.: US 11,061,314 B2
(45) Date of Patent: Jul. 13, 2021

(54) PROJECTION SCREEN AND PROJECTION DISPLAY APPARATUS

(71) Applicant: SONY CORPORATION, Tokyo (JP)

(72) Inventors: Yuji Nakahata, Tokyo (JP); Hidehiko Takanashi, Kanagawa (JP); Hideki Ono, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/483,157

(22) PCT Filed: Feb. 2, 2018

(86) PCT No.: PCT/JP2018/003570
§ 371 (c)(1),
(2) Date: Aug. 2, 2019

(87) PCT Pub. No.: WO2018/150907
PCT Pub. Date: Aug. 23, 2018

(65) Prior Publication Data
US 2020/0272043 A1 Aug. 27, 2020

(30) Foreign Application Priority Data
Feb. 16, 2017 (JP) .............................. JP2017-026533

(51) Int. Cl.
*G03B 21/62* (2014.01)
*G02B 5/23* (2006.01)
(Continued)

(52) U.S. Cl.
CPC .............. *G03B 21/62* (2013.01); *G02B 5/23* (2013.01); *G03B 21/10* (2013.01); *G03B 21/56* (2013.01);
(Continued)

(58) Field of Classification Search
CPC ...... G03B 21/62; G03B 21/625; G03B 21/56; G03B 21/10; H04N 9/3141
See application file for complete search history.

(56) References Cited

U.S. PATENT DOCUMENTS 7,914,154 B2 * 3/2011 Obi ...................... H04N 9/3105
353/79
8,449,123 B2 * 5/2013 Mizoguchi ........... G02B 26/085
353/79
(Continued)

FOREIGN PATENT DOCUMENTS

| CN | 101405651 A | 4/2009 |
|---|---|---|
| CN | 106662803 A | 5/2017 |

(Continued)

OTHER PUBLICATIONS

International Search Report and Written Opinion of PCT Application No. PCT/JP2018/003570, dated Apr. 17, 2018, 10 pages of ISRWO.

(Continued)

*Primary Examiner* — Clayton E. LaBalle
*Assistant Examiner* — Kevin C Butler
(74) *Attorney, Agent, or Firm* — Chip Law Group

(57) ABSTRACT

There is provided a projection screen and a projection display apparatus that make it possible to improve display quality. A projection screen according to an embodiment of the present disclosure includes a display member (50) having transmittance or reflectance that varies in accordance with first light (UV) to be applied.

17 Claims, 8 Drawing Sheets

(51) Int. Cl.
*H04N 9/31* (2006.01)
*G03B 21/10* (2006.01)
*G03B 21/56* (2006.01)
*G03B 21/625* (2014.01)

(52) U.S. Cl.
CPC ......... *G03B 21/625* (2013.01); *H04N 9/3141* (2013.01)

(56) References Cited

U.S. PATENT DOCUMENTS

| | | | | |
|---|---|---|---|---|
| 8,487,233 | B2 * | 7/2013 | Baudou | G02B 27/01 |
| | | | | 250/214 AL |
| 8,591,042 | B1 * | 11/2013 | Hajjar | G03B 21/13 |
| | | | | 353/94 |
| 8,648,904 | B2 * | 2/2014 | Hamano | G03B 21/006 |
| | | | | 348/115 |
| 9,019,584 | B2 * | 4/2015 | Yamaichi | G03H 1/2294 |
| | | | | 359/9 |
| 9,132,361 | B2 * | 9/2015 | Smithwick | G02B 21/00 |
| 9,164,367 | B2 * | 10/2015 | Chang | G03B 21/28 |
| 9,445,065 | B1 * | 9/2016 | Reichow | G03B 21/26 |
| 10,564,536 | B2 * | 2/2020 | Pan | G03B 21/56 |
| 10,571,792 | B2 * | 2/2020 | Pan | G03B 21/58 |
| 2006/0290905 | A1 | 12/2006 | May | |
| 2009/0091718 | A1 | 4/2009 | Obi et al. | |
| 2017/0160621 | A1 | 6/2017 | Yamashita | |
| 2017/0205701 | A1 | 7/2017 | Ide et al. | |

FOREIGN PATENT DOCUMENTS

| | | | |
|---|---|---|---|
| CN | 107077058 A | 8/2017 | |
| JP | 2007-004177 A | 1/2007 | |
| TW | 200702889 A | 1/2007 | |
| WO | 2007/108387 A | 9/2007 | |
| WO | WO-2007108387 A1 * | 9/2007 | ........... H04N 9/3129 |
| WO | 2014/017344 A1 | 1/2014 | |
| WO | 2016/035227 A1 | 3/2016 | |
| WO | 2016/068087 A1 | 5/2016 | |

OTHER PUBLICATIONS

Office Action for CN Application No. 201880011311, dated Dec. 2, 2020.

* cited by examiner

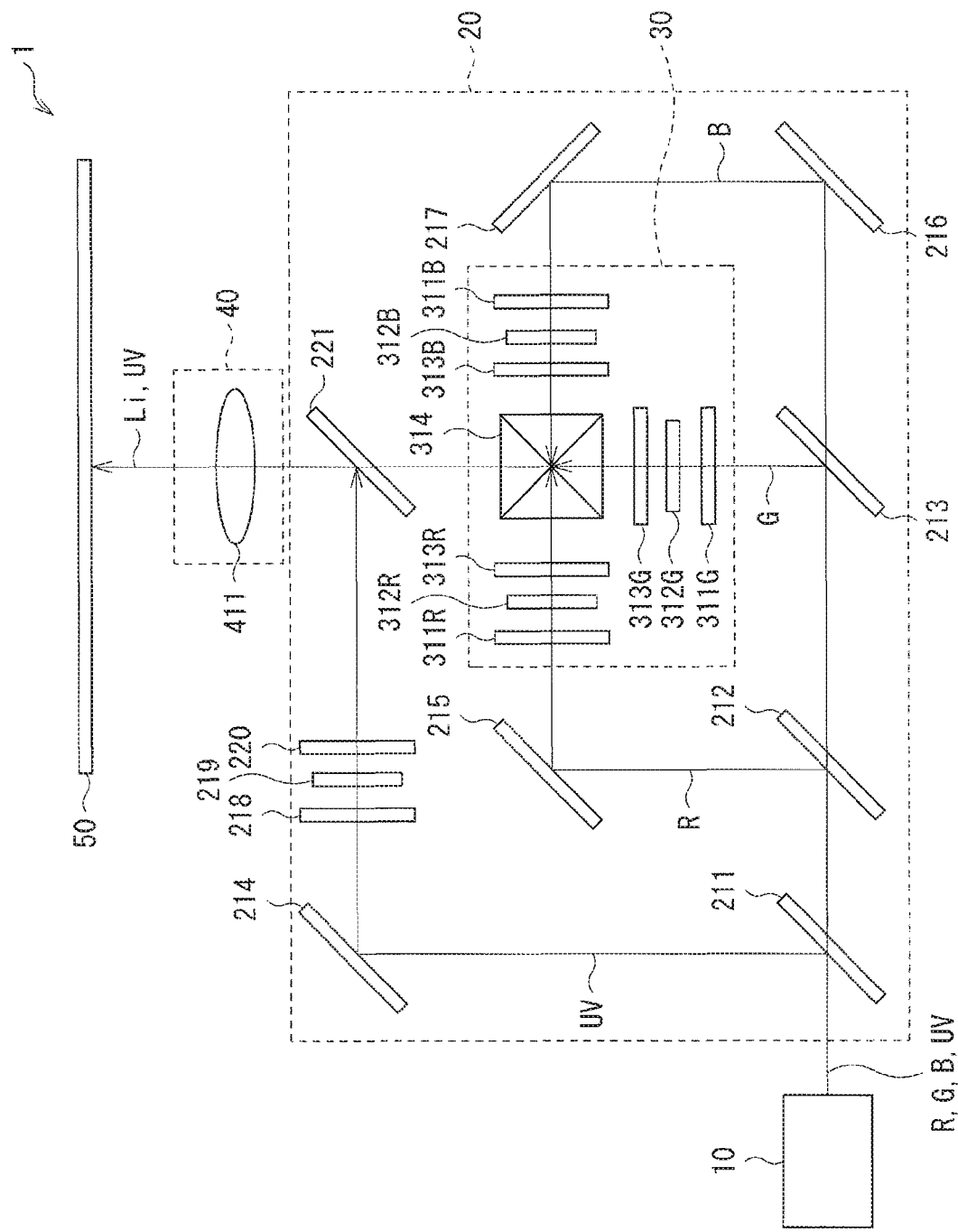
[FIG. 1]

[FIG. 2]
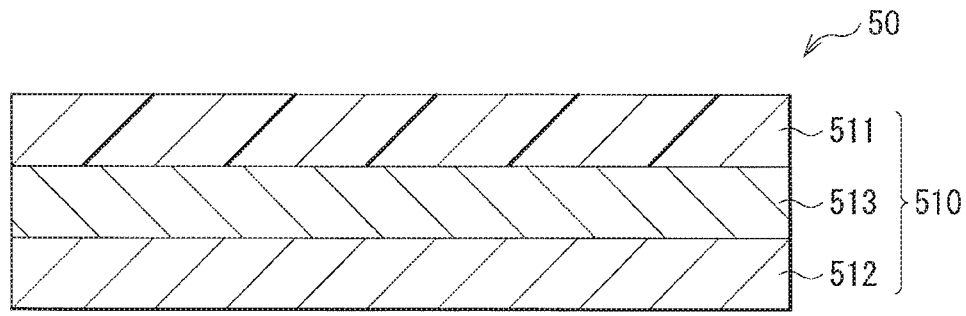
[FIG. 3]
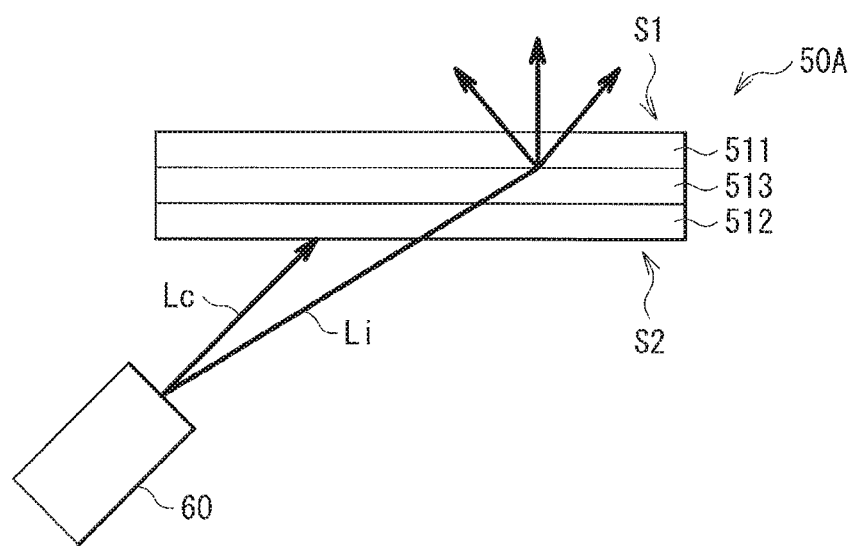
[FIG. 4]
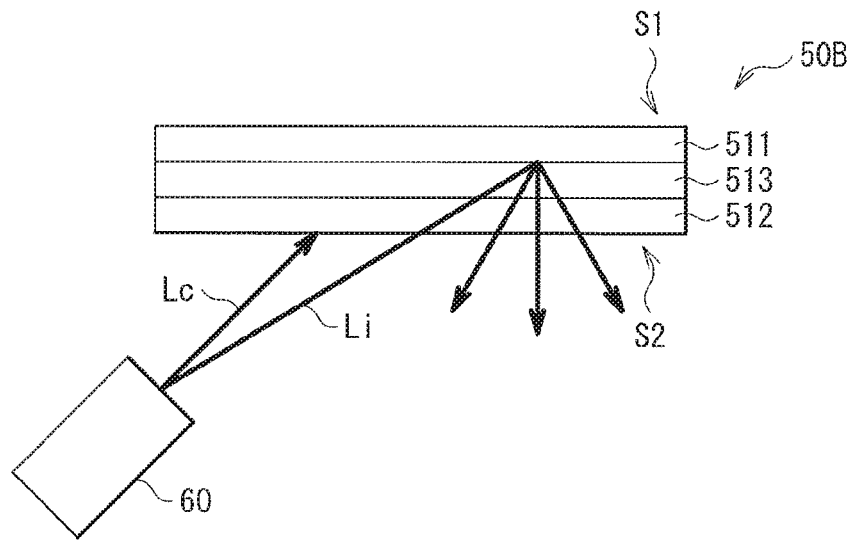

[FIG. 5]
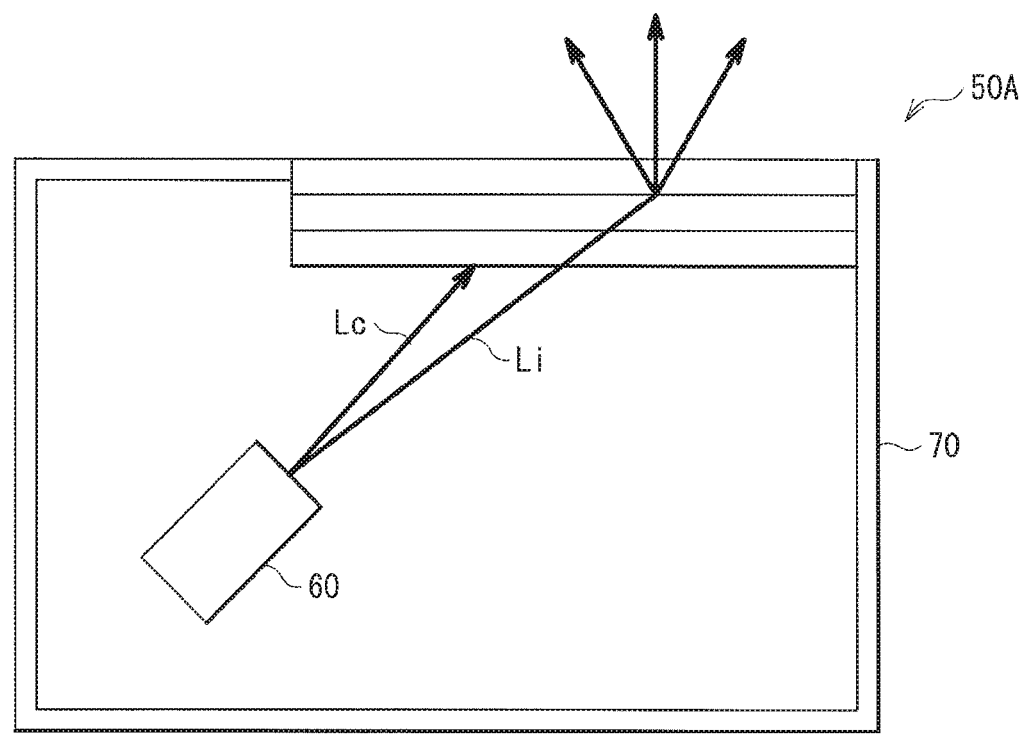

[FIG. 6]
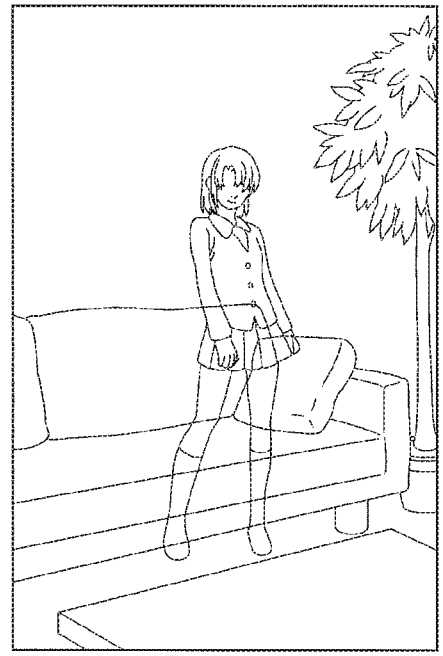
[FIG. 7]
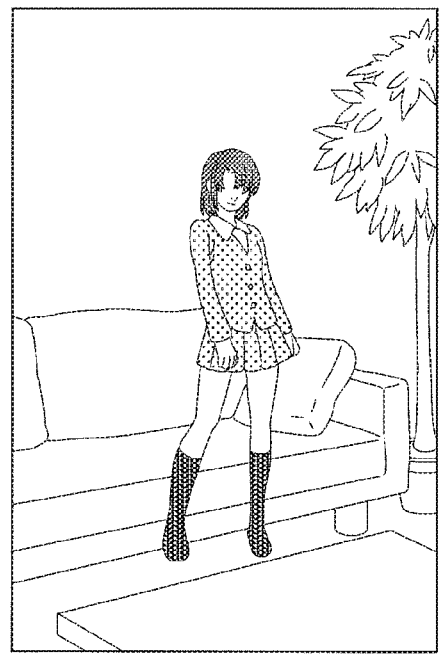

[ FIG. 8 ]
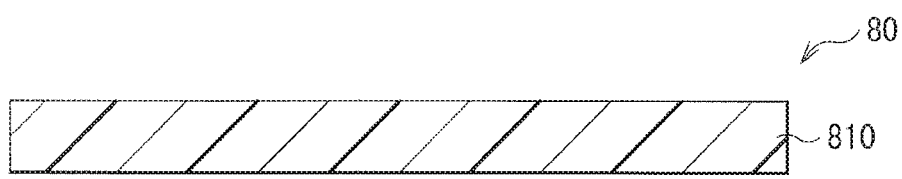
[ FIG. 9 ]
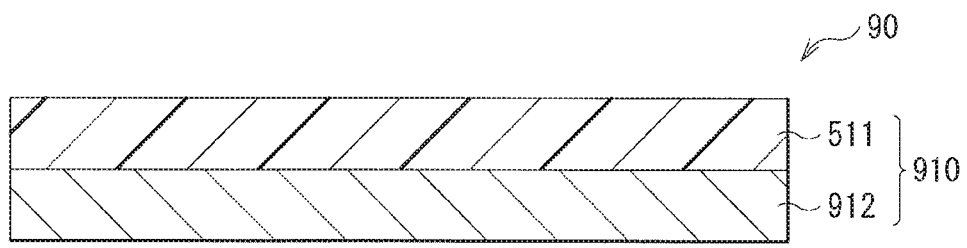

[ FIG. 10 ]
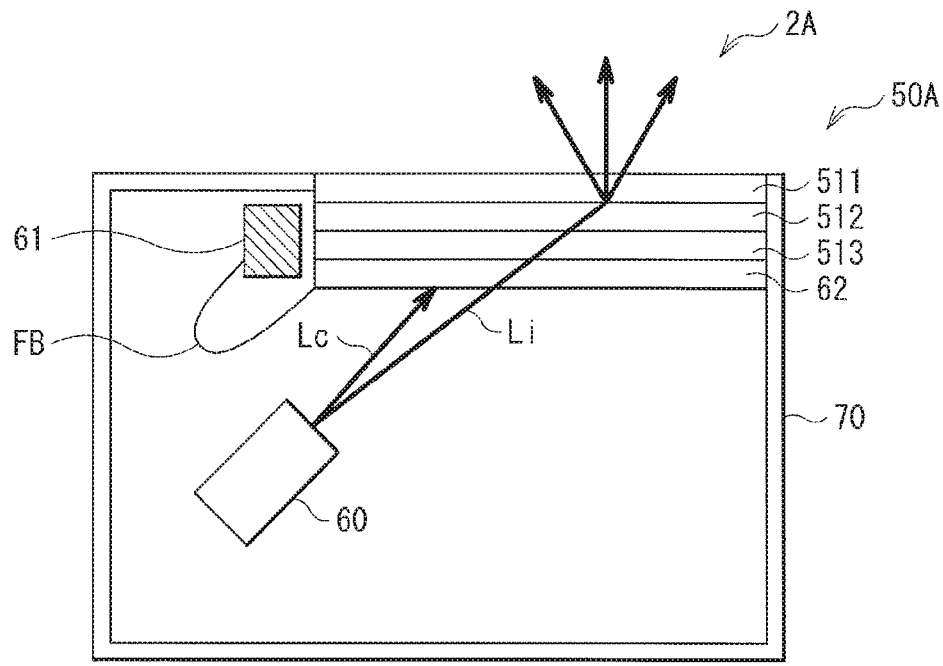
[ FIG. 11 ]
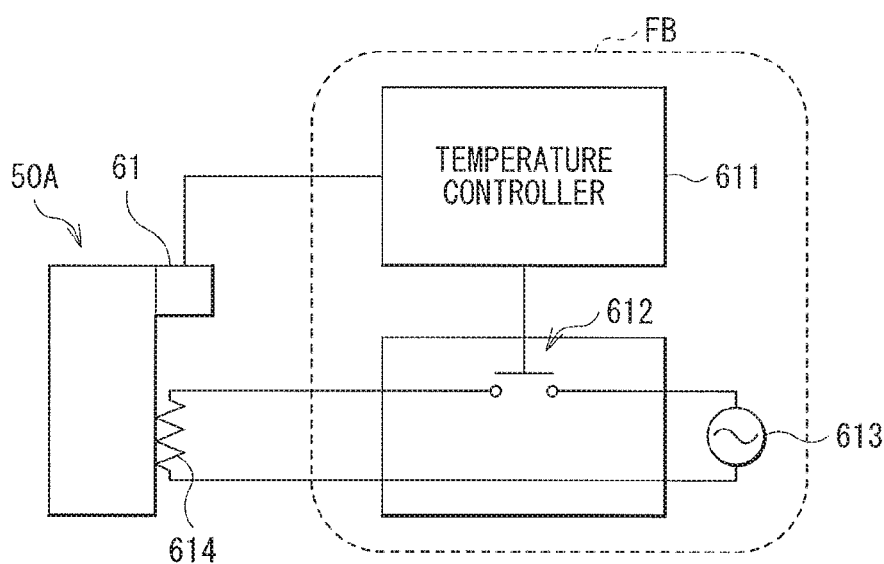

[FIG. 12]
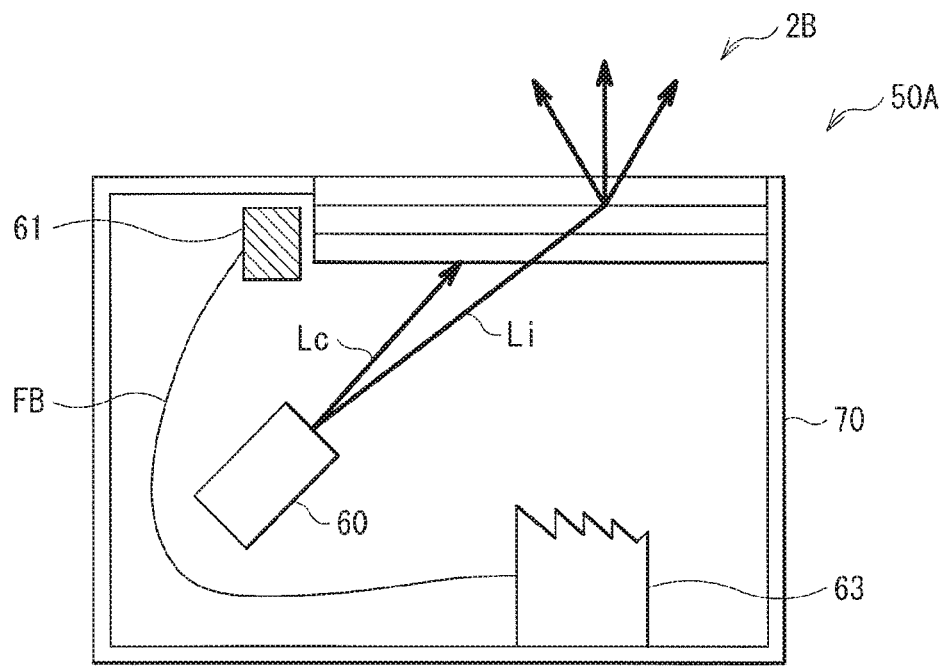
[FIG. 13]
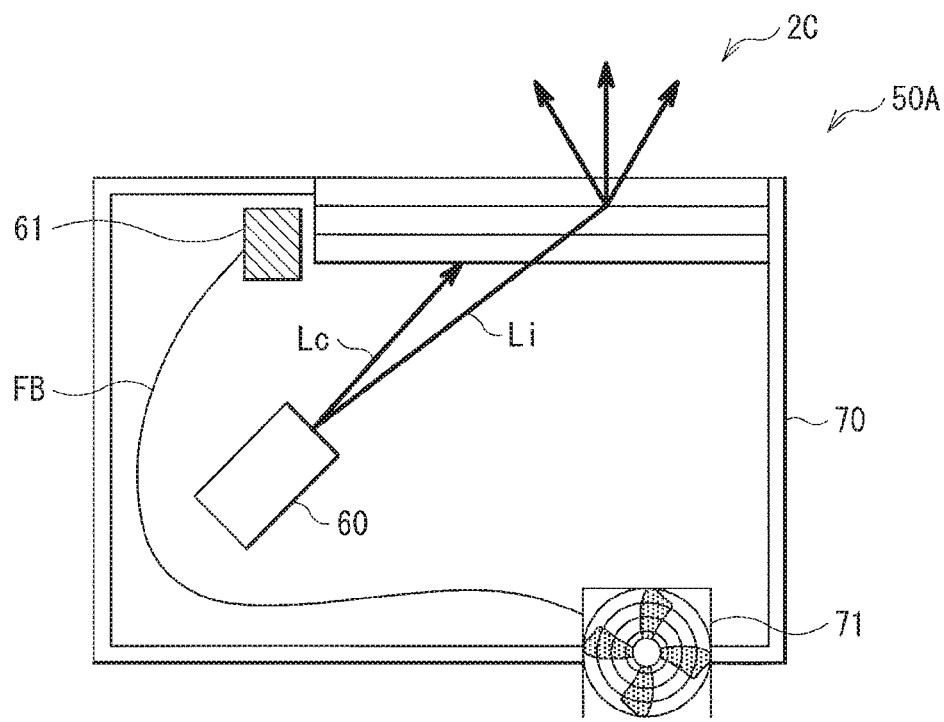

[ FIG. 14 ]
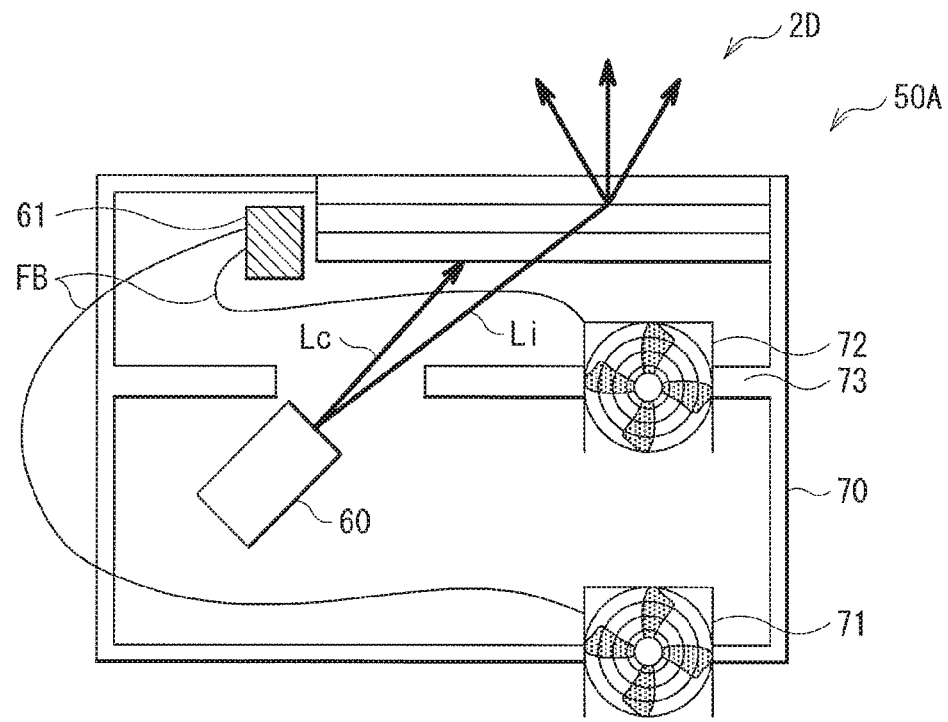
[ FIG. 15 ]
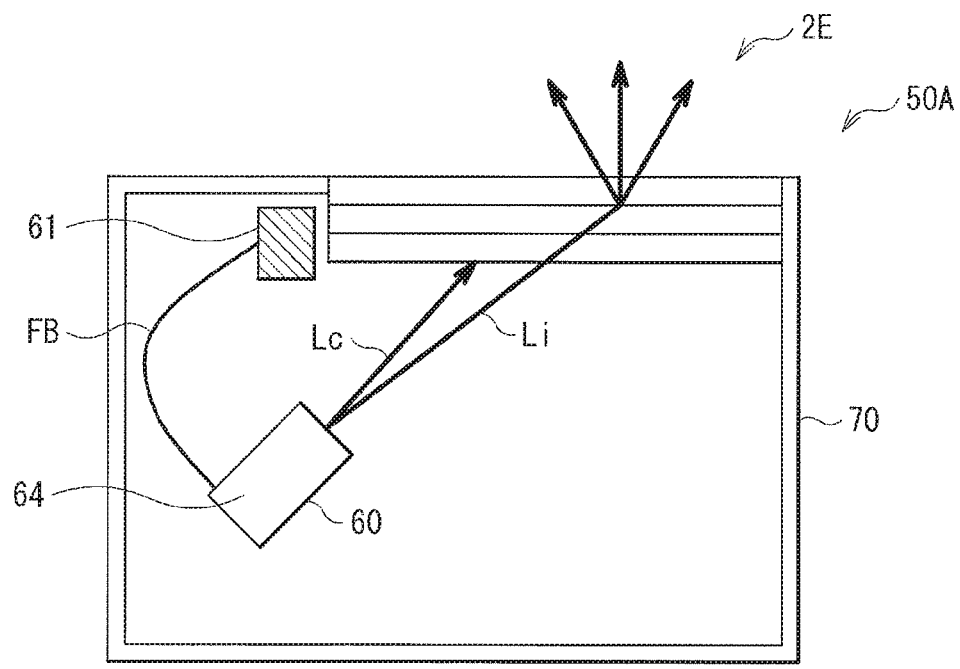

PROJECTION SCREEN AND PROJECTION DISPLAY APPARATUS

CROSS REFERENCE TO RELATED APPLICATIONS

This application is a U.S. National Phase of International Patent Application No. PCT/JP2018/003570 filed on Feb. 2, 2018, which claims priority benefit of Japanese Patent Application No. JP 2017-026533 filed in the Japan Patent Office on Feb. 16, 2017. Each of the above-referenced applications is hereby incorporated herein by reference in its entirety.

TECHNICAL FIELD

The present disclosure relates to a projection screen having, for example, a light-controlling function and a projection display apparatus including the projection screen.

BACKGROUND ART

In image display using a typical projector, brightness of a screen in a non-lighted state is in black luminance. Consequently, in a bright environment where an amount of reflected light of the screen is large, contrast of a displayed picture is reduced, which thus aggravates visibility. In a screen configured by a transparent glass substrate including a scattering agent, in particular, the aggravated visibility is conspicuous.

Examples of methods of improving the aggravated visibility include a method of enhancing luminance of a projector. In addition to the method, for example, PTL 1 discloses an image display apparatus that controls light of a screen by combination of a TFT (Thin Film Transistor) liquid crystal and a PDLC (Polymer Dispersed Liquid Crystal).

CITATION LIST

Patent Literature

PTL 1: International Publication No. WO 2014/017344

SUMMARY OF THE INVENTION

Accordingly, there has been a demand for a projection display apparatus having superior display quality including visibility.

It is desirable to provide a projection screen and a projection display apparatus that make it possible to improve display quality.

A projection screen according to an embodiment of the present disclosure includes a display member having transmittance or reflectance that varies in accordance with first light to be applied.

A projection display apparatus according to an embodiment of the present disclosure includes a light source device; an image-generating optical system that generates image light by modulating light from the light source device on the basis of an inputted image signal; a projection optical system that projects the image light generated by the image-generating optical system; and a projection screen that displays the image light projected from the projection optical system. The projection screen has components identical to those of the projection screen according to the foregoing embodiment of the present disclosure.

In the projection screen and the projection display apparatus according to the respective embodiments of the present disclosure, use of the display member having the transmittance or the reflectance that varies in accordance with the light to be applied (first light) makes it possible to arbitrarily vary black luminance of the display member.

According to the projection screen and the projection display apparatus of the respective embodiments of the present disclosure, the transmittance or the reflectance of the display member varies in accordance with the light to be applied, thus making it possible to achieve desired black luminance and to improve the display quality.

It is to be noted that the effects described here are not necessarily limiting, and may be any of effects described in the present disclosure.

BRIEF DESCRIPTION OF DRAWINGS

FIG. 1 is a schematic diagram illustrating an example of a configuration of a projection display apparatus according to an embodiment of the present disclosure.

FIG. 2 is a cross-sectional view of a configuration of a screen illustrated in FIG. 1.

FIG. 3 is a schematic diagram that describes an example of a configuration of each of the screen and a projection section illustrated in FIG. 1.

FIG. 4 is a schematic diagram that describes another example of the configuration of each of the screen and the projection section illustrated in FIG. 1.

FIG. 5 is a schematic diagram illustrating an overall configuration of the projection display apparatus illustrated in FIG. 1.

FIG. 6 is a schematic diagram illustrating image display in a typical projection display apparatus.

FIG. 7 is a schematic diagram illustrating image display in the projection display apparatus illustrates in FIG. 1.

FIG. 8 is a cross-sectional view of a configuration of a screen according to Modification Example 1 of the present disclosure.

FIG. 9 is a cross-sectional view of a configuration of a screen according to Modification Example 2 of the present disclosure.

FIG. 10 is a schematic diagram illustrating an example of an overall configuration of a projection display apparatus according to Modification Example 3 of the present disclosure.

FIG. 11 is a block diagram that describes a temperature-regulating mechanism of a rear screen 50A illustrated in FIG. 10.

FIG. 12 is a schematic diagram illustrating another example of an overall configuration of the projection display apparatus according to the Modification Example 3 of the present disclosure.

FIG. 13 is a schematic diagram illustrating another example of the overall configuration of the projection display apparatus according to the Modification Example 3 of the present disclosure.

FIG. 14 is a schematic diagram illustrating another example of the overall configuration of the projection display apparatus according to the Modification Example 3 of the present disclosure.

FIG. 15 is a schematic diagram illustrating another example of the overall configuration of the projection display apparatus according to the Modification Example 3 of the present disclosure.

MODES FOR CARRYING OUT THE INVENTION

In the following, some embodiments of the present disclosure are described in detail with reference to the drawings. It is to be noted that description is given in the following order.
1. Embodiment (An example of a projection display apparatus provided with a screen having a light-controlling layer)
    1-1. Configuration of Screen
    1-2. Configuration of Projection Display Apparatus
    1-3. Workings and Effects
2. Modification Example 1 (An example of a screen in which a display layer and a light-controlling layer are integrated)
3. Modification Example 2 (An example where a light-controlled light cutting function is added to the light-controlling layer)
4. Modification Example 3 (An example of a projection display apparatus provided with a temperature detector and a temperature elevation mechanism)

1. Embodiment

FIG. 1 illustrates a configuration of a projection display apparatus (projection display apparatus 1) according to an embodiment of the present disclosure. The projection display apparatus 1 includes a light source device 10, a lighting optical system 20, an image forming section 30, a projection optical system 40, and a screen 50 that displays an image generated by the image forming section 30 and supplied from the projection optical system 40. FIG. 2 illustrates a cross-sectional configuration of the screen 50 illustrated in FIG. 1. A projection screen (screen 50) of the present embodiment has a configuration in which, as a display member 510 that displays an image, a light-controlling layer 512, a protective layer 513, and a display layer 511 are stacked in this order. It is to be noted that an "image" used in the present disclosure includes not only a static image but also a moving image.

(1-1. Configuration of Screen)

The display layer 511 is a commonly used screen; examples thereof include a matte screen, a pearl screen, a silver screen, a beads screen, and a transmissive screen. The matte screen is a so-called a diffusion screen, for example, configured by a fabric or a resin sheet with a paint including a scattering agent being applied to a surface thereof. The pearl screen and the silver screen are each a so-called reflection screen with pearl-based resin or a metal powder-based paint being applied to a surface thereof. The beads screen has a surface to which optical lens glass balls are applied. The transmissive screen, when directly viewed, for example, is transmissive to light of a wavelength in a visible region, and is a translucent screen configured by vinyl, acrylic, glass, etc. It is to be noted that the display layer 511 only has to reflect RGB light (image light Li) projected from the projection optical system 40; for example, a wall, etc. may be used, in addition to the fabric or the resin sheet mentioned above.

The display layer 11 may be configured through the use of a hologram, a half mirror, a surface plasmon particle, a cholesteric liquid crystal, a Fresnel lens, and the like, in addition to those described above.

The light-controlling layer 512 absorbs light (first light, light-controlled light (Lc)) of a wavelength different from a wavelength (RGB) used as the image light (Li) to cause transmittance or reflectance to vary (reduce). It is preferable to use, as the light-controlled light (Lc), light of a wavelength ranging from 350 nm to 420 nm or ranging from 700 nm to 2.5 μm. Specific examples thereof include ultraviolet rays (UV) or infrared rays (IR). This makes it possible to vary the transmittance or reflectance of the light-controlling layer 512 without damaging color representation of an image. As used herein, the "light control" refers to varying the transmittance or reflectance of the screen to improve image contrast.

It is preferable that the light-controlling layer 512 be formed by means of a leuco pigment and a color developer, for example. This enables the light-controlling layer 512 of the present embodiment to cause a region irradiated with the light-controlled light (Lc) to turn black and to reduce the transmittance or the reflectance, for example.

Examples of the leuco pigment include a fluoran compound used in a typical thermal paper. The leuco pigment reversibly develops or removes a color by being used with an acid compound called the color developer. Specifically, as represented by the following expression (1), for example, a lactone ring of the fluoran compound opens or closes upon addition or detachment of a hydrogen ion ($H^+$), which causes color development or color removal.

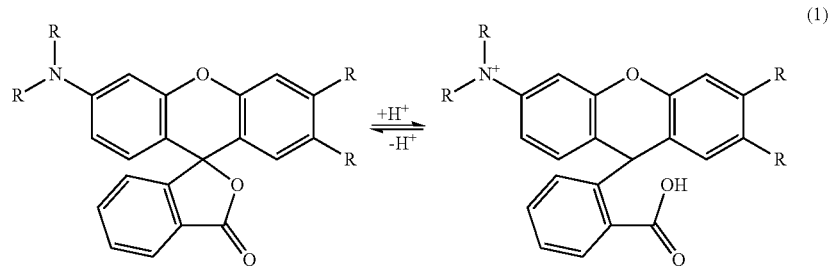

(1)

Description is given of a mechanism of the color development/color removal of the leuco pigment. The leuco pigment in a color-removed state enter a color-developed state when the leuco pigment is heated till they melt and mix with a composition including a color developer of a long-chain type, for example. When the composition is gradually cooled from such a state, the composition including the leuco pigment is decolored because of rearrangement of the color developer. Meanwhile, when the composition is rapidly cooled, the composition is fixed to the color-developed state where the leuco pigment and the long-chain type color developer are aggregated regularly to some extent. This forms a color-developed image in the composition. This aggregate is broken when heated from the color-developed state to a temperature lower than melting (color development) temperature. The color developer then separates from the leuco pigment, crystallize alone to cause the composition to be decolored. In this system, it is considered that intermolecular cohesion of a long-chain alkyl group of the color developer acts as a driving force on both the color development and the color removal. The color development results from formation of a molecular aggregate, and the color removal results from molecular aggregate structure change and phase separation.

In addition, the light-controlling layer 512 may vary the reflectance or the transmittance in multiple steps. It is possible to achieve the multistep variation in the reflectance or the transmittance by varying intensity of the light-controlled light (Lc), for example. Specifically, in a case where the light-controlled light (Lc) with low intensity is applied, only a material close to an irradiated surface in a thickness direction of the light-controlling layer 512 is colored. This results in small variation in the transmittance and the reflectance. In a case where the light-controlled light (Lc) with high intensity is applied, a material distant from the irradiated surface in the thickness direction of the light-controlling layer 512 is also colored. This results in large variation in the transmittance and the reflectance. Varying the intensity of the light-controlled light (Lc) in the multiple steps in this manner also causes the reflectance or the transmittance of the light-controlling layer 512 to vary in the multiple steps. Moreover, it is also possible to adjust a color tone of the color development.

Furthermore, the light-controlling layer 512 may also be formed by means of a photothermal converting agent, together with the leuco pigment and the color developer. The photothermal converting agent absorbs light of a predetermined wavelength region, for example, to generate heat. It is preferable that the photothermal converting agent have selective absorption characteristics to the light-controlled light (Lc).

The light-controlling layer 512 is formed by, for example, a macromolecular material including the leuco pigment, the color developer, and the photothermal converting agent, for example. The light-controlling layer 512 preferably has a thickness ranging from 0.1 µm to 200 µm, and more preferably ranging from 1 µm to 100 µm, for example.

It is preferable that the protective layer 513 be provided between the display layer 511 and the light-controlling layer 512. The protective layer 513 serves to block application of the light-controlled light (Lc) to the display layer 511 to prevent deterioration (yellowing) of the display layer 511 due to the application of the light-controlled light (Lc). It is preferable that the protective layer 513 be formed by means of a material that selectively absorbs or reflects the ultraviolet rays (UV) or the infrared rays (IF) used as the light-controlled light (Lc). Examples of such a material include a scattering agent such as zinc oxide and titanium oxide and an absorbing agent such as methoxycinnamic acid octyl (or ethylhexyl methoxycinnamate), t-butyl methoxydibenzoylmethane, oxybenzone-3, a cyanine pigment, a phthalocyanine pigment, and a squarylium pigment. The protective layer 513 has a thickness ranging from 1 µm to 200 µm, for example.

(1-2. Configuration of Projection Display Apparatus)

As described above, the projection display apparatus 1 of the present embodiment includes the light source device 10, the lighting optical system 20, the image forming section 30, the projection optical system 40, and the above-described screen 50, in order. It is to be noted that the lighting optical system 20 and the image forming section 30 correspond to a specific example of an image-generating optical system of the present disclosure. Although the projection display apparatus 1 illustrated in FIG. 1 exemplifies a projection display apparatus of a transmissive 3 LCD (liquid crystal display) method that performs light modulation using transmissive liquid crystal panels (liquid crystal panels 312R, 312G, and 312B), the projection display apparatus 1 is not limited thereto. For example, the projection display apparatus 1 may be configured as a projection display apparatus of a reflection 3 LCD method that performs the light modulation using a reflection liquid crystal panel.

It is to be noted that the projection display apparatus 1 of the present embodiment may also be applied to a projector using a digital micromirror device (DMD: Digital Micromirror Device), etc., for example, instead of the reflection liquid crystal panel and the transmissive liquid crystal panels.

In the light source device 10 is disposed a light source necessary for color image display. The light source emits white light that includes red light (R), blue light (B), and green light (G). In the present embodiment, in the light source device 10 is further disposed a light source that emits light (for example, UV) other than RGB. The light sources are each configured by, for example, a halogen lamp, a metal halide lamp, a xenon lamp, or the like. In addition, for example, a solid-state light source such as a semiconductor laser (LD) or a light emitting diode (LED) may also be used.

The lighting optical system 20 includes dichroic mirrors 211, 212, and 213, and total reflection mirrors 214, 215, 216, and 217, for example.

The dichroic mirror 211 is disposed on an optical path of the light source, and has a function to separate light (R, G, B, and UV) emitted from the light source device 10 into ultraviolet rays (UV) and other light (R, G, and B). The dichroic mirror 211 is similarly disposed on the optical path of the light source, and has a function to separate the light (R, G, and B) having passed through the dichroic mirror 211 to the red light (R) and other light (G and B). The dichroic mirror 212 is similarly disposed on the optical path of the light source and has the function to separate the light (G and B) having passed through the dichroic mirror 212 to the green light (G) and other light (blue light (B)).

The total reflection mirror 214 is disposed on an optical path of ultraviolet rays (UV) reflected by the dichroic mirror 211, and reflects the ultraviolet rays (UV) reflected by the dichroic mirror 211 toward a polarizing plate 218. The total reflection mirror 215 is disposed on the optical path of the red light (R) reflected by the dichroic mirror 212, and reflects the red light (R) reflected by the dichroic mirror 212 toward a polarizing plate 311R. The total reflection mirror 216 is disposed on the optical path of the blue light (B) having passed through the dichroic mirror 213, and reflects the blue light (B) having passed through the dichroic mirror 213 toward the total reflection mirror 217. The total reflection mirror 217 is disposed on the optical path of the blue light (B) reflected by the total reflection mirror 216, and reflects the blue light (B) toward a polarizing plate 311B.

The image forming section 30 includes the polarizing plates 311R, 311G and 311B, the liquid crystal panels 312R, 312G, and 312B, polarizing plates 313R, 313G, and 313B, and a dichroic prism 314.

The polarizing plate 311R is disposed on the optical path of the red light (R), and has a function to separate, on a polarization separation plane, the inputted red light (R) into two polarization components that are orthogonal to each other. The polarizing plate 311G is disposed on the optical path of the green light (G), and has a function to separate, on a polarization separation plane, the inputted green light (G) into two polarization components that are orthogonal to each other. The polarizing plate 311B is disposed on the optical path of the blue light (B), and has a function to separate, on a polarization separation plane, the inputted blue light (B) into two polarization components that are orthogonal to each other. Each of the polarization separation planes reflects one polarization component (for example, an S-polarization component) while transmitting the other polarization component (for example, a P-polarization component).

The liquid crystal panels 312R, 312G, and 312B are each the transmissive liquid crystal panel, and generates image light of each color by modulating incident light on the basis of an inputted image signal. The transmissive panel 312R is disposed on the optical path of the red right (R) reflected on the polarization separation plane of the polarizing plate 311R. The liquid crystal panel 312R has functions to modulate incident light by being driven by a digital signal that is pulse-width modulated (PWM) in accordance with a red image signal, for example, and to transmit the modulated light toward the polarizing plate 313R. The liquid crystal panel 312G is disposed on the optical path of the green light (G) reflected on the polarization separation plane of the polarizing plate 311G. The liquid crystal panel 312G has functions to modulate incident light by being driven by a digital signal that is pulse-width modulated (PWM) in accordance with a green image signal, for example, and to transmit the modulated light toward the polarizing plate 313G. The liquid crystal panel 312B is disposed on the optical path of the blue light (B) reflected on the polarization separation plane of the polarizing plate 311B. The liquid crystal panel 312B has functions to modulate incident light by being driven by the digital signal that is pulse-width modulated (PWM) in accordance with a blue image signal, for example, and to transmit the modulated light toward the polarizing plate 313B.

Similarly to the foregoing polarizing plates 311R, 311G, and 311B, the polarizing plates 313R, 313G, and 313B are disposed on the optical paths of the light of the respective colors (R, B, and B) having passed through the respective liquid crystal panels 312R, 312G, and 312B. The polarizing plates 313R, 313G, and 313B each have the function to separate, on the polarization separation plane, the inputted color light (R, G, and B) into the two polarization components that are orthogonal to each other. Each of the polarization planes reflects one polarization component (for example, the S-polarization component), while transmitting the other polarization component (for example, the P-polarization component) to cause the transmitted light to enter the dichroic prism 314.

The dichroic prism 314 overlaps and combines the red light (R), the green light (G), and the blue light (B) inputted from three directions, and outputs the combined image light (Li) toward the projection optical system 40.

The ultraviolet rays (UV) reflected by the total reflection mirror 214 to the polarizing plate 218 are separated, on the polarization separation plane of the polarizing plate 218, into the two polarization components that are orthogonal to each other; the polarization separation plane reflects one polarization component (for example, the S-polarization component), while transmitting the other polarization component (for example, the P-polarization component).

Similarly to the liquid crystal panels 312R, 312G, and 312G, the liquid crystal panel 219 is the transmissive liquid crystal panel, and generates the light-controlled light (Lc) by modulating incident light on the basis of the inputted image signal. The liquid crystal panel 219 is disposed on the optical path of the ultraviolet rays reflected on the polarization separation plane of the polarizing plate 311R. It is to be noted that, for example, MEMS (Micro Electro Mechanical Systems) such as a DLP (digital light processing) may be used in the light modulation for the light-controlled light. In a case where the ultraviolet rays (UV) are used as the light-controlled light (Lc), in particular, it is preferable to use the MEMS that is less susceptible to the ultraviolet rays (UV) because of concern about deterioration of the liquid crystal panels.

The polarizing plate 220 is disposed on the optical path of the ultraviolet rays ((UV), and the light-controlled light (Lc)) that are transmitted through the liquid crystal panel 219, and has a function to separate, on the polarization separation plane, the inputted ultraviolet rays (UV) into the two polarization components that are orthogonal to each other. Each of the polarization separation planes reflects one polarization component (for example, the S-polarization component), while transmitting the other polarization component (for example, the P-polarization component) toward the dichroic mirror 221.

The dichroic mirror 221 is disposed on the optical path of the image light (Li) and the light-controlled light (Lc), and transmits the image light (Li). The dichroic mirror 221 also reflects the light-controlled light (Lc), and outputs the image light (Li) and the light-controlled light (Lc) to the projection optical system 40.

The projection optical system 40 includes a plurality of lenses including a projection lens 411. The projection optical system 40 expands the image light (Li) combined by the dichroic prism 314 and the light-controlled light (Lc) reflected by the dichroic mirror 221, and projects the image light (Li) and the light-controlled light (Lc) that are expanded to the screen 50.

FIG. 3 and FIG. 4 each illustrate configurations of the screen 50 and a projection section 60 including the light source device 10, the lighting optical system 20, the image forming section 30, and the projection optical system 40.

The screen illustrated in FIG. 3 is a rear screen 50A, and the projection section 60 is placed on side of a surface S2 that is a rear face of the rear screen 50A. The rear screen 50A projects the image light (Li) and the light-controlled light (Lc) from the side of the surface S2. The projected image light (Li) is reflected to side of a surface S1 on the display layer 511, and an image is viewed from side of a front face (surface S1).

The screen illustrated in FIG. 4 is a front screen 50B, and the projection section 60 is also placed on the side of the surface S2 of the front screen 50B, similarly to the rear screen 50A. In the front screen 50B, the side of the surface S2 is the front face facing an observer. The front screen 50B projects the image light (Li) and the light-controlled light (Lc) from the side of the surface S2. The projected image light (Li) is reflected to the side of the surface S2 on the display layer 511, and an image is viewed from the side of the surface S2.

It is to be noted that any of the screens (50A and 50B) has a similar configuration to that of the screen 50 illustrated in FIG. 2.

In addition, in the projection display apparatus 1 of the present embodiment, in a case where the ultraviolet rays (UV) or the infrared rays (IR) are used as the light-controlled light (Lc), it is preferable that, as illustrated in FIG. 5, the projection section 60 be surrounded by a housing (shielding member 70) provided continuously to the screen 50, for example. It is preferable that the shielding member 70 be configured by a film, etc., absorbing the light (UV or IR, in particular) used as the light-controlled light (LC), for example. This makes it possible to reduce influence, of stray light of the ultraviolet rays (UV) or the infrared rays (IR), on an external object, etc.

(1-3. Workings and Effects)

As described above, in image display using a typical projector, brightness of a screen in a non-lighted state is in black luminance. Consequently, in a bright environment, an amount of reflected light of the screen becomes large, causing contrast of a displayed image to be reduced, which thus aggravates visibility. As illustrated in FIG. 6, for example, in a case where an image of a person, for example, is projected on a transparent screen such as a glass substrate, in particular, a background is in a see-through state. In the transparent screen, black display constitutes background luminance. Consequently, the foregoing state is conspicuous in a black display part, in particular, thus significantly reducing the visibility of the black display part.

As described above, examples of the methods of improving aggravation of the visibility include a method of increasing the luminance of a projector or a method of electrically controlling light of the screen by combining a TFT liquid crystal and a PDLC. In these methods, however, an active element such as the TFT is formed, thus leading to increased costs, limitation in screen size, or reduction of a screen gain. In addition, the transparent screen has a possibility of further reducing the transmittance.

In contrast, the screen 50 of the present embodiment is provided with the light-controlling layer 512 having the transmittance or the reflectance that varies upon application of, for example, the light-controlled light (Lc) such as the ultraviolet rays (UV). This makes it possible to arbitrarily vary (reduce) the transmittance or the reflectance of a desired region by applying the light-controlled light (Lc).

As described above, the screen 50 of the present disclosure is provided with the light-controlling layer 512 having the transmittance or the reflectance that varies upon application of the light-controlled light (Lc). This makes it possible to enhance the contrast of the image displayed on the screen 50 by varying the transmittance or the reflectance of the desired region, and to improve the visibility. In a case where the screen 50 is configured as the transparent screen, in particular, it is possible to change the desired region (black display part, for example) to black, for example, and thus to make the black luminance on the screen 50 lower than the background luminance. This makes it possible to display the image without the background being seen through, even on the transparent screen, as illustrated in FIG. 7, and thus to improve the visibility. That is, provision of the projection display apparatus 1 with superior display quality becomes possible.

It is to be noted that although the present embodiment has exemplified a case where the color development and the color removal of the light-controlling layer 512 vary in accordance with light, this is not limitative. For example, selection of an appropriate color developer destabilizes the color-developed state where the leuco pigment and the color developer are aggregated regularly, thus making it possible to remove the color developed in the light-controlling layer 512 in a certain definite period of time. This makes application of light for color removal unnecessary, thus allowing for shortened time to write display. This also allows for reduced power consumption.

In addition, in the present embodiment, the protective layer 513 is provided between the display layer 511 and the light-controlling layer 512. The protective layer 513 absorbs or reflects the light-controlled light (Lc). This makes it possible to prevent deterioration, such as yellowing, of the display layer 511 in a case where the UV or the IR is used as the light-controlled light (Lc), for example.

Furthermore, in the projection display apparatus 1 of the present embodiment, a light source for the light-controlled light is used in addition to the RGB light sources forming the image light (Li), and the optical system (lighting optical system 20 and projection optical system 40) common to the image light (Li) is used as the optical system for the light-controlled light (Lc). This makes an optical axis of the light-controlled light (Lc) applied to the screen 50 substantially identical to that of the image light (Li), which allows for reduction of a positional deviation between a light-controlled region and an image display region.

It is to be noted that the light-controlled light (Lc) may be applied from a projection section different from the projection section (projection section 60) that applies the image light (Li), using an optical system different from the optical system that forms and projects the image light (Li), for example. However, from a viewpoint of the positional deviation, etc., it is preferable that the image light (Li) and the light-controlled light (Lc) be applied, together with the image light (Li), from the same projection section 60, as in the present embodiment.

Next, description is given of modification examples of the present disclosure. In the following, same components as those of the foregoing embodiment are denoted by same reference numerals, and description thereof is omitted where appropriate.

2. Modification Example 1

FIG. 8 illustrates a cross-sectional configuration of a screen 80 according to Modification Example 1 of the present disclosure. The screen 80 of the present modification example is configured by a display member 810 in which the display layer 511 and the light-controlling layer 512 in the foregoing embodiment are integrated.

It is possible to form the display member 810 of the present modification example by means of the scattering agent, and the macromolecular material including the leuco pigment, the color developer, and the photothermal converting agent described above, for example. This makes the screen 80 a single-layer structured, thus achieving an effect of allowing for reduction of the number of processes in screen manufacturing, in addition to the effects of the foregoing embodiment. Moreover, this allows for an improved fabrication yield.

3. Modification Example 2

FIG. 9 illustrates a cross-sectional configuration of a screen 90 according to Modification Example 2 of the present disclosure. The screen 90 of the modification example is configured by a display member 910 in which the display layer 511 and a light-controlling layer 912 are stacked. In the light-controlling layer 912, the light-controlling layer 512 and the protective layer 513 in the foregoing embodiment are integrated.

The light-controlling layer 912 of the present modification example has a light-controlling function in which the transmittance and the reflectance vary upon absorption of the light-controlled light (Lc) and a protection function that prevents deterioration of the display layer 511 in a case where the ultraviolet rays (UV) or the infrared rays (IR) are used as the light-controlled light (Lc). It is possible to form the light-controlling layer 912 using, for example, the foregoing leuco pigment, the color developer, and the photothermal converting agent as well as, for example, the macromolecular material including the scattering agent such as zinc oxide and titanium oxide or an absorbing agent such as methoxycinnamic acid octyl (or ethylhexyl methoxycinnamate), t-butyl methoxydibenzoylmethane, oxybenzone-3, a cyanine pigment, a phthalocyanine pigment, and a squarylium pigment. Similarly to the Modification Example 1, this also achieves the effect of reducing the number of processes in the screen manufacturing, in addition to the effects of the foregoing embodiment. Moreover, this allows for the improved fabrication yield.

4. Modification Example 3

FIG. 10 to FIG. 15 each schematically illustrate an example of an overall configuration of projection display apparatuses (projection display apparatuses 2A to 2D) according to the Modification Example 3 of the present disclosure. Similarly to the foregoing projection display apparatus 1 illustrated in FIG. 5 above, the projection display apparatuses 2A to 2D each includes a screen (for example, the rear screen 50A), the projection section 60, and the shielding member 70 provided continuously to the rear screen 50A and surrounding the projection section 60. The projection display apparatus 2 of the present modification example further includes a temperature detector (for example, a temperature sensor 61) that detects temperature of the rear screen 50A and a temperature elevation mechanism (for example, a heating wire film 62) that raises temperature of the rear screen 50A. The projection display apparatus 2 has a configuration in which the rear screen 50A is usable at a temperature higher than room temperature, for example.

FIG. 10 schematically illustrates an overall configuration of the projection display apparatus 2A that uses the heating wire film 62 as the temperature elevation mechanism. The projection display apparatus 2A includes, for example, the rear screen 50A, the projection section 60, and the shielding member 70 provided continuously to the rear screen 50A and surrounding the projection section 60. The projection display apparatus 2A further includes the temperature sensor 61 and the heating wire film 62 inside the shielding member 70, together with the projection section 60. The heating wire film 62 corresponds to a specific example of a heating element that configures the temperature elevation mechanism. The temperature sensor 61 serves to measure the temperature of the rear screen 50A, and is disposed on a side face of the rear screen 50A, for example. The heating wire film 62 is joined to the rear face of the rear screen 50A, for example, the light-controlling layer 512. The heating wire film 62 is configured by a transparent PET film in which an ITO wiring line, for example, is provided. The ITO wiring line is, for example, a transparent wiring line having a film thickness of 100 nm and a width of 50 µm. In the projection display apparatus 2A, Joule heat raises the temperature of the rear screen 50A by application of electricity to the ITO wiring line. The heating wire film 62 is coupled to the temperature sensor 61 via a feedback circuit (FB); adjusting an amount of electricity to be applied to the ITO wiring line depending on the temperature of the rear screen 50A allows for prevention of overheating.

The adjustment of the amount of electricity to be applied to the ITO wiring line depending on the temperature of the rear screen 50A is performed via the feedback circuit, for example. FIG. 11 illustrates an example of a configuration of the feedback circuit (FB) as a specific example of an adjustment mechanism that adjusts the temperature of the rear screen 50A. The feedback circuit (FB) includes, for example, a temperature controller 611, a relay switch 612, a heater power source 613, and a heating wire 614. In the feedback circuit (FB), the temperature controller 611 controls on or off of the relay switch 612 on the basis of a temperature measured by the temperature sensor 61 to adjust the amount of electricity to be applied to the heating wire 614. It is to be noted that the heating wire 614 corresponds to the ITO wiring line provided in the foregoing heating wire film 62. For example, in a case where the temperature measured by the temperature sensor 61 is higher than a set temperature, the temperature controller 611 turns off the relay switch 612 coupled to the heater power source 613, and cuts down the amount of electricity to the heating wire 614. This lowers the temperature of the rear screen 50A. In a case where the temperature measured by the temperature sensor 61 is lower than the set temperature, the temperature controller 611 turns on the relay switch 612 coupled to the heater power source 613. This applies electricity to the heating wire 614, and raises the temperature of the rear screen 50A.

FIG. 12 schematically illustrates an overall configuration of the projection display apparatus 2B using an infrared lamp 63 as the temperature elevation mechanism. The projection display apparatus 2B includes, for example, the rear screen 50A, the projection section 60, and the shielding member 70 provided continuously to the rear screen 50A and surrounding the projection section 60. The projection display apparatus 2B further includes the temperature sensor 61 and the infrared lamp 63 inside the shielding member 70, together with the projection section 60. The infrared lamp 63 corresponds to a specific example of the heating element that configures the temperature elevation mechanism. For example, the infrared lamp 63 is disposed behind the rear screen 50A inside the shielding member 70. In the projection display apparatus 2B, the infrared lamp 63 is coupled to the temperature sensor 61 via the feedback circuit (FB); adjusting the amount of electricity to be applied to the infrared lamp 63 depending on the temperature of the rear screen 50A allows for prevention of the overheating.

FIG. 13 schematically illustrates an overall configuration of the projection display apparatus 2C that utilizes exhaust heat in the apparatus as the temperature elevation mechanism. The projection display apparatus 2C includes, for example, the rear screen 50A, the projection section 60, and the shielding member 70 provided continuously to the rear screen 50A and surrounding the projection section 60. The projection display apparatus 2C further includes the temperature sensor 61 inside the shielding member 70, and is provided with a ventilating fan 71. In the projection display apparatus 2C of the present modification example, the light source device 10, the lighting optical system 20, the image forming section 30, and the projection optical system 40 that configure the projection section 60 are set as the heating element; heat generated in any of the components is utilized to raise the temperature of the rear screen 50A during optical output. The ventilating fan 71 provided for the shielding member 70 is coupled to the temperature sensor 61 via the feedback circuit (FB); adjusting the amount of electricity to be applied to the ventilating fan 71 depending on the temperature of the rear screen 50A allows for prevention of the overheating.

It is to be noted that a plurality of ventilating fans may be installed. FIG. 14 schematically illustrates an overall configuration of a projection display apparatus 2D in which two ventilating fans (ventilating fans 71 and 72) are installed. In the projection display apparatus 2D, a partition board 73 is provided in the shielding member 70, and a partition is made between the rear screen 50A and the projection section 60, for example. Similarly to the foregoing projection display apparatus 2C, the ventilating fan 71 of the two ventilating fans 71 and 72 is provided in the shielding member 70, and discharges air inside the shielding member 70 to the outside depending on the temperature of the rear screen 50A. The ventilating fan 72 is provided on the partition board 73, for example, and circulates the air inside the shielding member 70. To each of the ventilating fans 71 and 72 is coupled the temperature sensor 61 via the feedback circuit (FB); adjusting the amount of electricity to be applied to the ventilating fans 71 and 72 depending on the temperature of the rear screen 50A allows for efficient adjustment of the overheating, i.e., the temperature of the rear screen 50A.

It is to be noted that, similarly to the ventilating fans, a plurality of temperature sensors may be installed. For example, in a case where the two ventilating fans 71 and 72 are installed as with the projection display apparatus 2D, two temperature sensors may be installed, and each one of the two temperature sensors may be coupled to corresponding one of the ventilating fans 71 and 72 to independently adjust the amount of electricity to be applied. In addition, the temperature sensor 61 may not necessarily be installed on the side face of the rear screen 50A, and may be installed on the rear face of the rear screen 50A, for example.

Furthermore, the projection display apparatus according to the Modification Example 3 of the present disclosure may also be provided with an output control mechanism that adjusts an output of the image light (Li) outputted from the light source device 10. FIG. 15 schematically illustrates an overall configuration of a projection display apparatus 2E provided with an output control section 64 as the output control mechanism in the projection section 60. The output control section 64 is coupled to the temperature sensor 61 via the feedback circuit (FB), and enhances the output of the image light (Li) to be outputted from the light source device 10, in accordance with elevation of the temperature of the rear screen 50A, for example. This makes it possible to maintain concentration of the color development of the image displayed on the rear screen 50A.

An optical response speed of a pigment has a large influence on picture quality of an outputted image. For the foregoing light-controlling layers 512 and 912 or the display member 810, a photochromic material may be used as a pigment, in addition to the leuco pigment. Examples of the photochromic material include an azobenzene compound, a fulgide compound, a spiropyran compound, a diarylethene compound, and a spiroperimidine compound. Some photochromic material has a slow color removal speed; in a case of being used for the light-controlling layer 512 of the present disclosure, an influence thereof appears as a residual image.

In general, in a case where temperature is raised, the pigment such as the photochromic material tends to reduce the color development while a color removal speed is increased. In a case where the temperature is lowered, the pigment tends to reduce a degree of the color removal.

In contrast, in the present modification example, the temperature detector and the temperature elevation mechanism are provided inside the shielding member 70, for example. The temperature detector detects the temperature of the rear screen 50A, for example, and the temperature elevation mechanism raises the temperature of the rear screen 50A. This makes it possible to use the rear screen 50A at a temperature higher than the room temperature, for example, and thus to enhance the color removal speed of the pigments used in the light-controlling layer 512. Therefore, provision of a screen having the superior display quality and less residual image becomes possible. In addition, the configuration becomes simpler because a cooling mechanism is unnecessary, thus making it possible to reduce manufacturing costs.

In addition, the pigment is highly sensitive to temperature variations. In a case where the pigment is used as a constituent material as in the present disclosure, there is a possibility that the residual image and a gradation mottle of the color development may be easily influenced by an environmental temperature.

In contrast, in the present modification example, the output control mechanism (output control section 64) that adjusts an output of the image light (Li) depending on the temperature of the rear screen 50A is combined with the foregoing projection display apparatuses 2A to 2D, for example. This makes it possible to maintain the color development density of a pigment even in a case where the color removal speed of the pigment increases due to the temperature rise of the rear screen 50A. That is, provision of the screen that is less susceptible to the environmental temperature and allows for stable image display becomes possible. Moreover, it is also possible to achieve this effect only through a combination of the output control section 64 and the temperature sensor 61.

Although description has been given of the present disclosure with reference to the embodiment and the Modification Examples 1 to 3, the present disclosure is not limited to the foregoing embodiment, etc., and may be modified in a variety of ways. For example, the materials or thickness, etc., of the respective members that configure the screen described in the foregoing embodiment, etc., are merely exemplary, and are not limitative; other materials or thickness may also be adopted. In addition, the configurations of the projection display apparatuses described in the foregoing embodiment, etc., are merely exemplary, and it is not necessary to have all of the optical members; any other optical member may also be used to configure the projection display apparatus.

Moreover, the present technology may have the following configurations.

(1)

A projection screen including a display member having transmittance or reflectance that varies in accordance with first light to be applied.

(2)

The projection screen according to (1), in which the first light includes light of a wavelength different from a wavelength of light for an image.

(3)

The projection screen according to (1) or (2), in which the first light includes light of a wavelength ranging from 350 nm to 420 nm.

(4)

The projection screen according to (1) or (2), in which the first light includes light of a wavelength ranging from 700 nm to 2.5 µm.

(5)

The projection screen according to any one of (1) to (4), in which the display member includes a leuco pigment or a photochromic material.

(6)

The projection screen according to any one of (1) to (5), in which the display member includes a display layer and a light-controlling layer, the display layer displaying an image, the light-controlling layer having the transmittance and the reflectance that vary in accordance with the first light.

(7) The projection screen according to (6), in which the light-controlling layer includes the leuco pigment or the photochromic material.

(8) The projection screen according to (6) or (7), in which the display layer is configured by any one of a hologram, a half mirror, a surface plasmon particle, a cholesteric liquid crystal, and a Fresnel lens.

(9) The projection screen according to any one of (6) to (8), in which the light-controlling layer has the transmittance and the reflectance that vary in multiple steps.

(10) The projection screen according to any one of (6) to (9), including a protective layer provided between the display layer and the light-controlling layer, the protective layer absorbing or reflecting the first light.

(11) The projection screen according to any one of (1) to (10), in which the display member has light-transmissivity to a wavelength in a visible region, when directly viewed.

(12) A projection display apparatus including:
a light source device;
an image-generating optical system that generates image light by modulating light from the light source device on the basis of an inputted image signal;
a projection optical system that projects the image light generated by the image-generating optical system; and
a projection screen that displays the image light projected from the projection optical system,
the projection screen including a display member having transmittance or reflectance that varies in accordance with first light to be applied.

(13) The projection display apparatus according to (12), in which the light source device includes a light source that generates the image light and a light source of the first light.

(14) The projection display apparatus according to (12) or (13), in which the first light uses an optical system common to the image light.

(15) The projection display apparatus according to any one of (12) to (14), further including a temperature detector and a temperature elevation mechanism, the temperature detector detecting a temperature of the projection screen, the temperature elevation mechanism raising the temperature of the projection screen.

(16) The projection display apparatus according to (15), further including an adjustment mechanism that adjusts the temperature of the projection screen.

(17) The projection display apparatus according to (15) or (16), in which
the temperature elevation mechanism includes a heating element, and
the adjustment mechanism adjusts a current to be applied to the heating element.

(18) The projection display apparatus according to any one of (15) to (17), in which
the temperature elevation mechanism utilizes heat generated in any one of the light source device, the image-generating optical system, and the projection optical system, and
the adjustment mechanism adjusts an output of a fan provided in a housing that contains the light source device, the image-generating optical system, and the projection optical system.

(19) The projection display apparatus according to any one of (15) to (18), further including an output control mechanism that adjusts an output of the image light to be outputted from the light source device.

This application claims the benefits of Japanese Priority Patent Application JP2017-026533 filed with the Japan Patent Office on Feb. 16, 2017, the entire contents of which are incorporated herein by reference.

It should be understood that those skilled in the art could conceive various modifications, combinations, sub-combinations, and alterations depending on design requirements and other factors, insofar as they are within the scope of the appended claims or the equivalents thereof.

The invention claimed is:

1. A projection screen, comprising:
a display member having one of transmittance or reflectance that varies based on first light, wherein
the display member includes a protective layer, a display layer, and a light-controlling layer, and
the light-controlling layer includes a leuco pigment.

2. The projection screen according to claim 1, wherein a wavelength of the first light is different from a wavelength of second light for an image.

3. The projection screen according to claim 1, wherein the first light comprises light of a wavelength that ranges from 350 nm to 420 nm.

4. The projection screen according to claim 1, wherein the first light comprises light of a wavelength that ranges from 700 nm to 2.5 µm.

5. The projection screen according to claim 1, wherein
the display layer is configured to display an image, and
the light-controlling layer has the one of the transmittance or the reflectance that varies based on the first light.

6. The projection screen according to claim 5, wherein the display layer includes one of a hologram, a half mirror, a surface plasmon particle, a cholesteric liquid crystal, or a Fresnel lens.

7. The projection screen according to claim 5, wherein the light-controlling layer has one of the transmittance or the reflectance that varies at multiple steps.

8. The projection screen according to claim 1, wherein
the protective layer is between the display layer and the light-controlling layer, and
the protective layer is configured to one of absorb or reflect the first light.

9. The projection screen according to claim 1, wherein the display member has light-transmissivity to a wavelength in a visible region, when directly viewed.

10. A projection display apparatus, comprising:
a light source device;
an image-generating optical system configured to generate an image light by modulation of light from the light source device based on an inputted image signal;
a projection optical system configured to project the image light generated by the image-generating optical system; and
a projection screen configured to display the image light projected from the projection optical system, wherein the projection screen includes a display member having one of transmittance or reflectance that varies based on first light, the display member includes a protective layer, a display layer, and a light-controlling layer, and the light-controlling layer includes a leuco pigment.

11. The projection display apparatus according to claim 10, wherein the light source device includes a light source, the light source device is configured to generate the image light, and the light source is configured to generate the first light.

12. The projection display apparatus according to claim 10, wherein the first light is associated with an optical system common to the image light.

13. The projection display apparatus according to claim 10, further comprising a temperature detector and a temperature elevation mechanism, wherein the temperature detector is configured to detect a temperature of the projection screen, and the temperature elevation mechanism is configured to raise the temperature of the projection screen.

14. The projection display apparatus according to claim 13, further comprising an adjustment mechanism configured to adjust the temperature of the projection screen.

15. The projection display apparatus according to claim 14, wherein the temperature elevation mechanism includes a heating element, and the adjustment mechanism is configured to adjust a current applicable to the heating element.

16. The projection display apparatus according to claim 14, further comprising a housing, wherein the temperature elevation mechanism is configured to utilize heat generated in one of the light source device, the image-generating optical system, or the projection optical system, the adjustment mechanism is configured to adjust an output of a fan in the housing, and the housing contains the light source device, the image-generating optical system, and the projection optical system.

17. The projection display apparatus according to claim 13, further comprising an output control mechanism configured to adjust an output of the image light outputted from the light source device.

* * * * *